E. G. KELLER.
CAN OPENER.
APPLICATION FILED FEB. 5, 1916.
1,204,992.
Patented Nov. 14, 1916.
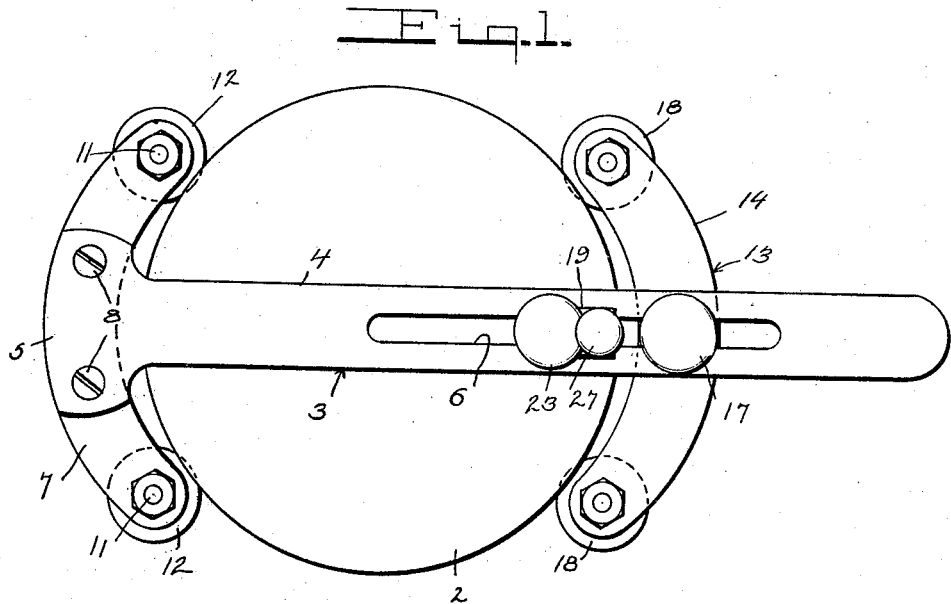
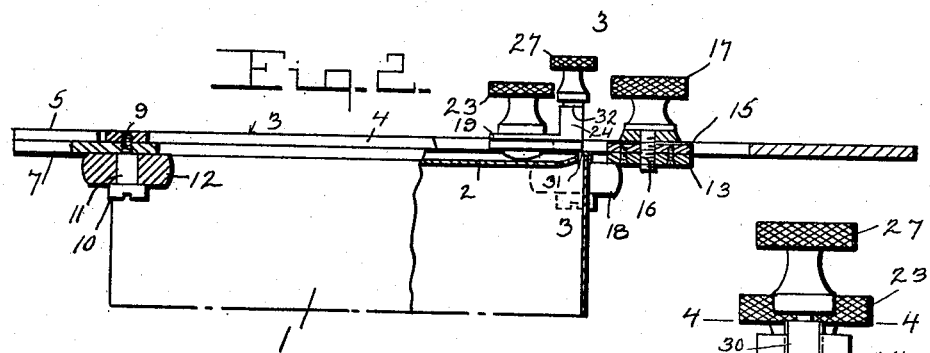
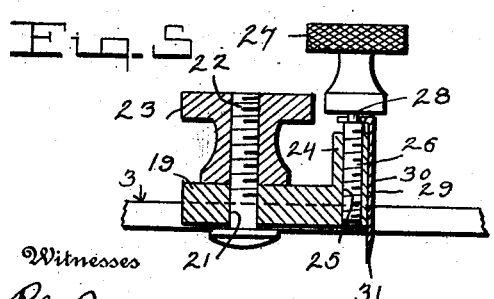
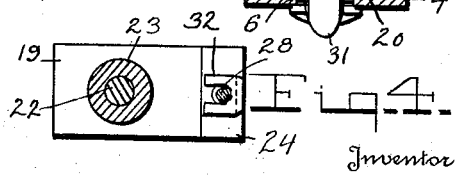
Witnesses
RM Jones
H. Kaye Martin
Inventor
E. G. Keller
By
Attorney

UNITED STATES PATENT OFFICE.

ERNEST G. KELLER, OF BEACON, NEW YORK, ASSIGNOR OF ONE-HALF TO RUDOLPH RIEDMANN, OF BEACON, NEW YORK.

CAN-OPENER.

1,204,992.  Specification of Letters Patent.  Patented Nov. 14, 1916.

Application filed February 5, 1916. Serial No. 76,461.

*To all whom it may concern:*

Be it known that I, ERNEST G. KELLER, a citizen of the Republic of Switzerland, residing at Beacon, in the county of Dutchess and State of New York, have invented certain new and useful Improvements in Can-Openers; and I do hereby declare the following to be a full, clear, and exact description of the invention, such as will enable others skilled in the art to which it appertains to make and use the same.

This invention relates to new and useful improvements in can openers and the principal object of the invention is to provide a can opener adapted for cutting the entire top of the can out to allow the contents to be readily removed.

With these and other objects in view, the invention consists in the novel combination and arrangement of parts which will be fully set forth in the following specification and accompanying drawings, in which:—

Figure 1 is a top plan view of the can showing a can opener constructed in accordance with this invention, in position thereon. Fig. 2 is a fragmentary side elevation of Fig. 1 showing portions thereof in section to more clearly illustrate the details of construction. Fig. 3 is an elongated transverse sectional view on line 3—3 of Fig. 2. Fig. 4 is a horizontal sectional view on the line 4—4 of Fig. 3, and Fig. 5 is a vertical longitudinal sectional view through the matter illustrated in Fig. 3.

Referring to the drawings the numeral 1 designates the body of the can, while the numeral 2 designates the top thereof.

The can opener is designated generally by the numeral 3 and comprises the stem or body 4 provided at one end with the head 5. A longitudinal slot 6 is formed intermediate the ends of the stem or body 4 and is adapted to slidably receive the guide blocks of the knife and guide member which will be more fully hereinafter described. The head 5 is provided with a pair of spaced apertures and is substantially arcuate in plan to conform to the shape of the forward guide member which will be described in detail in the following paragraph.

The forward guide member above referred to comprises an arcuate body 7 provided with suitable openings which aline with the openings in the head 5 and are adapted to receive the screws 8 by means of which the guide member is secured to the head. Formed near opposite ends of the guide member are suitable apertures 9 for receiving the threaded extensions of the screws 10 which are formed with the cylindrical portions 11 on which the guide rollers 12 are mounted. The screws are held in place by suitable nuts and it will thus be seen that the rollers 12 will be rotatably mounted at opposite ends of the guide member as clearly shown in the drawings. It will be noted upon reference to Fig. 2 that the guide member 7 is positioned on the under side of the body 4 and rollers are positioned beneath the guide member so that when the device is in place on a can the rollers will engage the body 1, while the body 4 of the opener will lie across the top of the can.

Coöperating with the forward guide member is the rear guide member designated by the numeral 13 comprising the arcuate body 14 having secured centrally and to its upper face the guide block 15 which is of a size sufficient to fit within the slot 6 and permit free movement of the body 14 longitudinally of the stem 4. In order to provide a means for holding the guide 13 adjustably along the stem a suitable threaded opening 16 is formed in the body and extends through the block 15 and this opening is adapted for the reception of a thumb screw 17 so that upon tightening the screw, the head thereof will engage the upper face of the stem 4 and frictionally hold the guide 13 against accidental movement. Suitable rollers 18 are carried at opposite ends of the body 14 and coöperate with the rollers 12 in properly guiding the device when in position on the can.

The cutter used in connection with the device is best illustrated in Figs. 3 to 5 inclusive and comprises a carrier block 19 provided with a central longitudinal guide 20 which guide is slidable in the slot 6 and is arranged so that the under face of the block 19 overlies a portion of the stem 4 on opposite sides of the slot. A suitable opening 21 is formed in the block 19 and is adapted for the reception of the bolt 22 on which the thumb nut 23 is threaded. The head of the bolt is positioned on the under side of the stem 4 and is adapted to frictionally engage the said stem to hold the block in various adjusted positions. Extending upwardly from one end of the block is a stem 24 provided with an internally screw threaded axially disposed opening 25 for the reception of the stem 26 to the thumb screw 27 which is provided near the point where the stem joins the head with a reduced cylindrical extension 28 the use of which will appear as the description proceeds. The end of the extension 24 is provided with a dove-tailed groove 29 for the reception of the blade 30, the side edges of which are beveled to fit the groove. The lower end of the blade is sharpened as at 31 while the upper end is bent inwardly and bifurcated to form the arms 32 which fit around the reduced portion 28 and thus form an attaching means by which the blade is attached to the carrier block.

It will be apparent from the foregoing that in use the device is placed in position on the can as shown in Fig. 1 and the guide 13 is moved in the proper position to bring the rollers 18 in active position against the side of the can. The block 19 is then moved to bring the blade into proper cutting position with relation to the top 2 and the blade is then driven in the top and upon rotating the device it will be seen that the top will be cut from the side and the entire top will be cut out if desired thereby facilitating the easy removal of the contents from the can.

While in the foregoing there has been shown and described the preferred embodiment of this invention, it is to be understood that such changes may be made in the combination and arrangement of parts as will fall within the spirit and scope of the appended claims.

What is claimed is:—

1. In a can opener, a body, a stationary guide at one end of the body, an adjustable guide at the opposite end of the body and an independently adjustable knife intermediate the guides.

2. In a can opener, a body having a longitudinal slot formed intermediate its ends, a stationary guide at one end of the body, a longitudinally adjustable guide, a block on said adjustable guide slidable in the slot, means to hold said adjustable guide in various adjusted positions on said body, a carrier block mounted to slide within said slot independently of the guides, means to hold said block in various adjusted positions on said body and a knife adjustably mounted on said block.

3. In a can opener, a body, a guide at one end of the body, guide rollers at opposite ends of the guide, an adjustable guide on the body, guide rollers on opposite ends of the adjustable guide and a knife adjustable longitudinally on the body independently of either guide.

4. A can opener comprising an elongated body having a substantially T-shaped head at one end, said body being provided with a longitudinal slot, a curved guide secured to the T-shaped head, guide rollers mounted at the ends of the guide, a guide block slidable in the slot, a curved guide secured to said block, a set screw extending into the block and through the slot for holding the adjustable guide in various adjusted positions on the body, guide rollers at the ends of the adjustable guide, a carrier block slidable in the slot intermediate the adjustable guide and the stationary guide, a set screw for holding the carrier block in various adjusted positions on the body, an upward extension at one end of the carrier block the outer face of said extension being provided with a dove-tailed groove, a blade slidably mounted in the said groove, a set screw threaded into the upper end of the extension and provided with a reduced neck intermediate the threaded portion and its head, and a bifurcated angular extension at the upper end of the blade surrounding the neck for adjusting said blade upon movement of the adjusting screw.

In testimony whereof I affix my signature in presence of two witnesses.

ERNEST G. KELLER.

Witnesses:
FREDERICK W. HEANEY,
SAMUEL K. PHILLIPS.

Copies of this patent may be obtained for five cents each, by addressing the "Commissioner of Patents, Washington, D. C."